(12) United States Patent
Nakajima et al.

(10) Patent No.: US 10,746,549 B2
(45) Date of Patent: Aug. 18, 2020

(54) PHYSICAL QUANTITY DETECTION APPARATUS, ELECTRONIC DEVICE, AND MOBILE BODY THAT COUNT A NUMBER OF TIMES A VIBRATOR BEGINS TO OSCILLATE

(71) Applicants: Seiko Epson Corporation, Tokyo (JP); DENSO CORPORATION, Kariya, Aichi (JP)

(72) Inventors: Kiminori Nakajima, Kamiina-gun (JP); Naoki Yoshida, Kariya (JP)

(73) Assignees: Seiko Epson Corporation (JP); DENSO CORPORATION (JP)

( * ) Notice: Subject to any disclaimer, the term of this patent is extended or adjusted under 35 U.S.C. 154(b) by 209 days.

(21) Appl. No.: 15/774,146

(22) PCT Filed: Oct. 27, 2016

(86) PCT No.: PCT/JP2016/081938
§ 371 (c)(1),
(2) Date: May 7, 2018

(87) PCT Pub. No.: WO2017/082071
PCT Pub. Date: May 18, 2017

(65) Prior Publication Data
US 2018/0328731 A1   Nov. 15, 2018

(30) Foreign Application Priority Data
Nov. 9, 2015 (JP) .................................. 2015-219723

(51) Int. Cl.
*G01C 19/5776*   (2012.01)

(52) U.S. Cl.
CPC .............................. *G01C 19/5776* (2013.01)

(58) Field of Classification Search
CPC .................. G01C 19/5776; G01C 19/56–5769
See application file for complete search history.

(56) References Cited

U.S. PATENT DOCUMENTS 8,474,317 B2 *  7/2013  Rizzo Piazza Roncoroni ............
G01C 19/56
331/154
2004/0182184 A1   9/2004  Yokoi et al.
(Continued)

FOREIGN PATENT DOCUMENTS

JP    2003-021518 A    1/2003
JP    2004-286503 A    10/2004
(Continued)

*Primary Examiner* — Justin N Olamit
(74) *Attorney, Agent, or Firm* — Harness, Dickey & Pierce, P.L.C.

(57) ABSTRACT

A physical quantity detection apparatus includes a vibrator which outputs a detection signal in accordance with a physical quantity and a drive circuit which drives the vibrator to oscillate, wherein the drive circuit includes: an oscillation detecting unit which detects an oscillating state or a non-oscillating state of the vibrator based on a drive signal of the vibrator; a start-up oscillation unit which assists an oscillating operation of the vibrator when a detection result of the oscillation detecting unit represents the non-oscillating state; and a switching count monitoring unit which detects that the number of times switching is performed between the oscillating state and the non-oscillating state in the oscillation detecting unit has exceeded a set upper limit number of times.

10 Claims, 10 Drawing Sheets

(56) References Cited

U.S. PATENT DOCUMENTS

2009/0078045 A1    3/2009  Kanai et al.
2010/0206074 A1    8/2010  Yoshida et al.
2015/0351288 A1*  12/2015  Fukuda .............. B01D 46/0065
                                                        361/679.48

FOREIGN PATENT DOCUMENTS

JP    2008-157925 A    7/2008
JP    2010-190766 A    9/2010

* cited by examiner

PHYSICAL QUANTITY DETECTION APPARATUS, ELECTRONIC DEVICE, AND MOBILE BODY THAT COUNT A NUMBER OF TIMES A VIBRATOR BEGINS TO OSCILLATE

CROSS-REFERENCE TO RELATED APPLICATIONS

This application is a U.S. National Stage Application of International Application No. PCT/JP2016/081938, filed on Oct. 27, 2016, published in Japanese as WO 2017/082071 on May 18, 2017, which claims priority to Japanese Patent Application No. 2015-219723, filed on Nov. 9, 2015. The entire disclosures of the above applications are incorporated herein by reference.

BACKGROUND

Technical Field

The present invention relates to a physical quantity detection apparatus, an electronic device, and a mobile body.

Background Art

Physical quantity detection apparatuses which detect a variety of physical quantities are known. For example, an angular velocity detection apparatus which detects angular velocity as a physical quantity is known, and various electronic devices and systems which are mounted with an angular velocity detection apparatus and which perform predetermined control based on angular velocity detected by the angular velocity detection apparatus are being widely used. For example, in vehicle travel control systems of automobiles, travel control for preventing an automobile from skidding sideways is performed based on angular velocity detected by an angular velocity detection apparatus.

Such physical quantity detection apparatuses include apparatuses which detect a physical quantity by driving and causing oscillation of a vibrator such as a crystal vibrator or a MEMS (Micro Electro Mechanical Systems) vibrator. In such apparatuses, the shorter a start-up time from start-up to stable oscillation, the better.

As techniques for reducing start-up time, for example, JP-A-2004-286503 discloses a technique for reducing an oscillation start-up time by supplying a rectangular-wave drive signal to a vibrator with a CR oscillator. In addition, for example, JP-A-2003-21518 discloses a technique for applying an addition signal prompting start-up oscillation of a vibrator to an inside of an oscillation loop via a switch when the vibrator is in a non-oscillating state.

With the configurations disclosed on JP-A-2004-286503 and JP-A-2003-21518, there is a risk of an occurrence of an anomaly in which are repeated a first state where an amplitude of a drive signal that drives a vibrator increases and, after oscillation start-up of the vibrator, the amplitude of the drive signal decreases and the vibrator enters a non-oscillating state and a second state where detection of the non-oscillating state prompts oscillation start-up, the amplitude of the drive signal increases, and the vibrator enters an oscillating state, and the occurrence of the anomaly may affect accuracy and reliability of signals output by circuits which operate based on the vibrator.

The invention has been made in consideration of problems such as that described above and, according to some aspects of the invention, a physical quantity detection apparatus, an electronic device, and a mobile body capable of anomaly determination output with higher reliability can be provided.

SUMMARY

The invention has been made in order to solve at least a part of the problems described above and can be realized as aspects or application examples presented below.

Application Example 1

According to one application example of the invention, there is provided a physical quantity detection apparatus including:
a vibrator which outputs a detection signal in accordance with a physical quantity; and
a drive circuit which drives the vibrator to oscillate,
the drive circuit including:
an oscillation detecting unit which detects an oscillating state or a non-oscillating state of the vibrator based on a drive signal of the vibrator;
a start-up oscillation unit which assists an oscillating operation of the vibrator when a detection result of the oscillation detecting unit represents the non-oscillating state; and
a switching count monitoring unit which detects that the number of times switching is performed between the oscillating state and the non-oscillating state in the oscillation detecting unit has exceeded a set upper limit number of times.

According to the above application example, whether or not an anomaly in which the oscillating state and the non-oscillating state are repeated has occurred can be detected by the switching count monitoring unit. A physical quantity detection apparatus capable of anomaly determination output with higher reliability can be realized.

Application Example 2

In the physical quantity detection apparatus described above,
the oscillation detecting unit may output an oscillating state signal representing the oscillating state or the non-oscillating state, and
the switching count monitoring unit may include a counter unit which determines whether the oscillating state signal output by the oscillation detecting unit in synchronization with a clock signal with a higher frequency than a frequency of the start-up oscillation unit represents the oscillating state or the non-oscillating state, and which counts the number of times switching is performed.

According to the above application example, since the number of times switching is performed between the oscillating state and the non-oscillating state can be counted with a simple configuration, whether or not an anomaly in which the oscillating state and the non-oscillating state are repeated has occurred can be detected with a simple configuration.

Application Example 3

The above physical quantity detection apparatus may further include a reset circuit which outputs a reset signal of the physical quantity detection apparatus when the switching count monitoring unit detects that the number of times switching is performed has exceeded the upper limit number of times.

According to the above application example, by initializing the physical quantity detection apparatus based on a reset signal output when an anomaly in which the oscillating state and the non-oscillating state are repeated has occurred, an appropriate oscillating operation can be prompted.

Application Example 4

In the physical quantity detection apparatus described above,
the drive circuit may include a switch which connects or disconnects an oscillation loop formed between the drive circuit and the vibrator, and
the switching count monitoring unit may disconnect and subsequently connect the switch the switch when detecting that the number of times switching is performed has exceeded the upper limit number of times.

According to the above application example, by performing oscillation start-up once again when an anomaly in which the oscillating state and the non-oscillating state are repeated has occurred, an appropriate oscillating operation can be prompted.

Application Example 5

In the physical quantity detection apparatus described above,
the drive circuit may include a switch which connects or disconnects an oscillation loop formed between the drive circuit and the vibrator, and
the switching count monitoring unit may change a frequency of the start-up oscillation unit and disconnect and subsequently connect the switch the switch when detecting that the number of times switching is performed has exceeded the upper limit number of times.

According to the above application example, by changing the frequency of the start-up oscillation unit and performing oscillation start-up once again when an anomaly in which the oscillating state and the non-oscillating state are repeated has occurred, an appropriate oscillating operation can be prompted.

Application Example 6

In the physical quantity detection apparatus described above,
the drive circuit may include a switch which connects or disconnects an oscillation loop formed between the drive circuit and the vibrator,
the drive circuit may receive an input of the drive signal from the vibrator via first wiring and may output the drive signal to the vibrator via second wiring, and
the switching count monitoring unit may increase a capacity between the first wiring and the second wiring and disconnect and subsequently connect the switch the switch when detecting that the number of times switching is performed has exceeded the upper limit number of times.

According to the above application example, by reducing an apparent Q factor of the vibrator as viewed from the drive circuit and performing oscillation start-up once again when an anomaly in which the oscillating state and the non-oscillating state are repeated has occurred, an appropriate oscillating operation can be prompted.

Application Example 7

The above physical quantity detection apparatus may further include a register, and the switching count monitoring unit may write error information into the register when detecting that the number of times switching is performed has exceeded the upper limit number of times.

According to the above application example, error information can be readily utilized by another circuit block or apparatus.

Application Example 8

In the physical quantity detection apparatus described above,
the switching count monitoring unit may output an error signal to the outside when detecting that the number of times switching is performed has exceeded the upper limit number of times.

According to the above application example, error information can be readily utilized by another circuit block or apparatus.

Application Example 9

According to one application example, there is provided an electronic device including the above physical quantity detection apparatus.

According to the above application example, an electronic device with high operational reliability can be realized since the electronic device includes a physical quantity detection apparatus capable of anomaly determination output with high reliability.

Application Example 10

According to one application example, there is provided a mobile body including the above physical quantity detection apparatus.

According to the above application example, a mobile body with high operational reliability can be realized since the mobile body includes a physical quantity detection apparatus capable of anomaly determination output with high reliability.

DETAILED DESCRIPTION

Hereinafter, preferable embodiments of the invention will be described in detail with reference to the drawings. The used drawings are provided for convenience of description. It is to be understood that the embodiments described below are not intended to unreasonably limit contents of the invention described in the claims.

It is also to be understood that all of the components described below are not necessarily essential constituents of the invention.

1. Physical Quantity Detection Apparatus

1-1. First Embodiment

Hereinafter, while a physical quantity detection apparatus (an angular velocity detection apparatus) which detects angular velocity as a physical quantity will be described as an example, the invention can be applied to apparatuses capable of detecting any of a variety of physical quantities such as angular velocity, angular acceleration, acceleration, and force.

Figure 1:
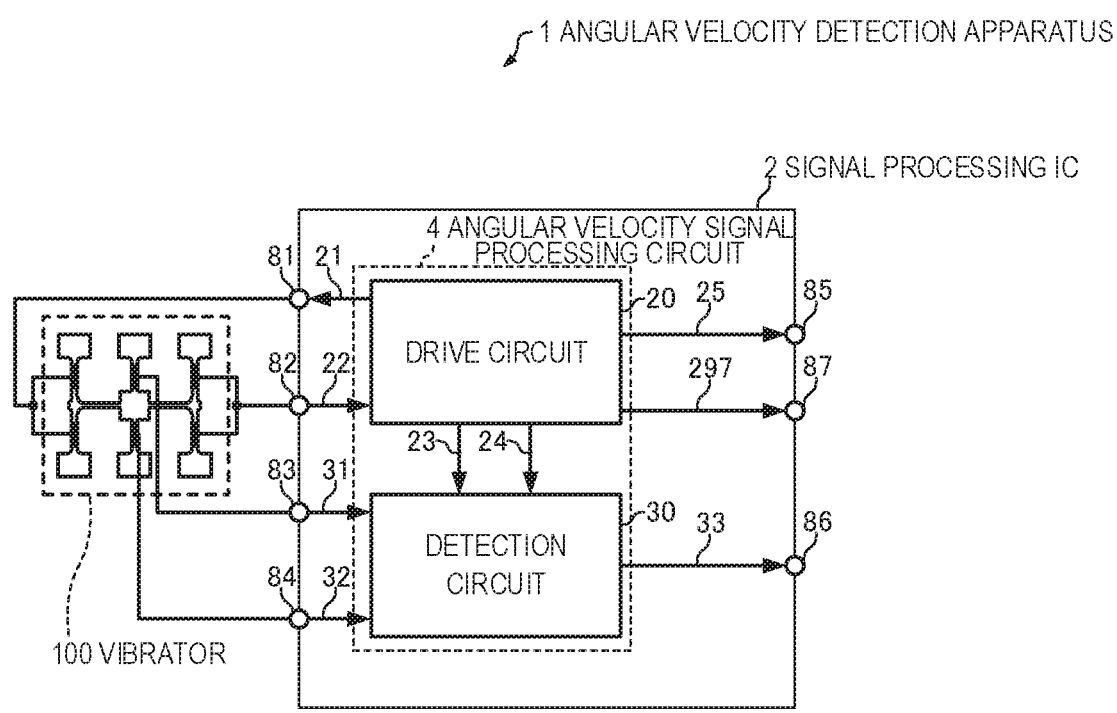
FIG. 1 is a functional block diagram of an angular velocity detection apparatus (an example of a physical quantity detection apparatus) according to a first embodiment of the invention.

FIG. 1 is a functional block diagram of an angular velocity detection apparatus (an example of a physical quantity detection apparatus) according to a first embodiment of the invention. The angular velocity detection apparatus 1 according to the first embodiment is configured so as to include a vibrator (a sensor element) 100 which outputs a detection signal in accordance with angular velocity (an example of a physical quantity) and a signal processing IC (integrated circuit apparatus) 2.

The vibrator 100 is configured such that an oscillating piece on which are arranged a drive electrode and a detecting electrode is encapsulated in a package (not shown). Generally, airtightness inside the package is ensured in order to increase oscillation efficiency by minimizing impedance of the oscillating piece.

The vibrator 100 according to the first embodiment has an oscillating piece formed from a z-cut crystal substrate. With an oscillating piece made of crystal, since a fluctuation in resonance frequency with respect to temperature variation is extremely small, detection accuracy of angular velocity can be advantageously increased. However, as the material of the oscillating piece of the vibrator 100, for example, a piezoelectric material including a piezoelectric single crystal such as lithium tantalate ($LiTaO_3$) and lithium niobate ($LiNbO_3$) and piezoelectric ceramics such as lead zirconate titanate (PZT), or a silicon semiconductor may be used in addition to crystal ($SiO_2$). For example, a structure may be adopted in which a piezoelectric thin film made of zinc oxide (ZnO), aluminum nitride (AlN), or the like and sandwiched between drive electrodes is arranged on a part of a surface of a silicon semiconductor.

In the first embodiment, the vibrator 100 is constructed by a so-called double-T oscillating piece having two T-type driving oscillating arms. However, the oscillating piece of the vibrator 100 is not limited to a double-T type and may be a tuning fork type, a comb tooth type, a tuning bar type with a triangular prism shape, a quadratic prism shape, a cylindrical shape, or the like.

Figure 2:
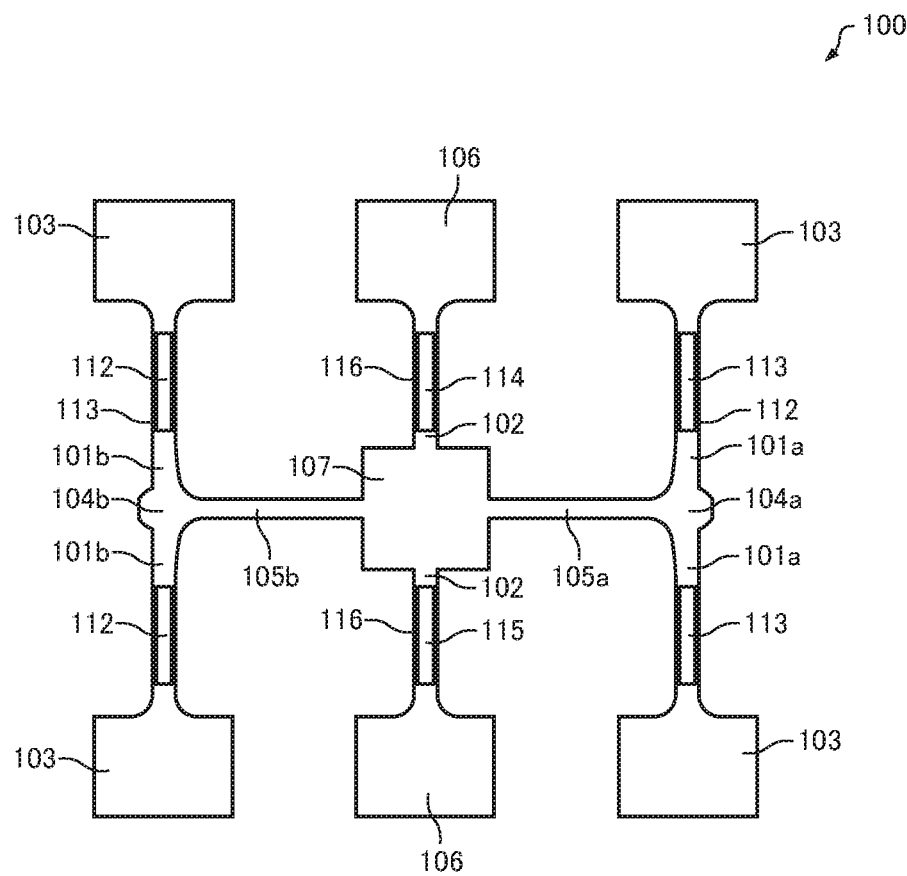
FIG. 2 is a plan view of an oscillating piece of a vibrator.

FIG. 2 is a plan view of the oscillating piece of the vibrator 100 according to the first embodiment. An X axis, a Y axis, and a Z axis in FIG. 2 represent axes of a crystal.

As illustrated in FIG. 2, in the oscillating piece of the vibrator 100, driving oscillating arms 101a and 101b respectively extend in a +Y axis direction and a −Y axis direction from two driving bases 104a and 104b. In this case, directions in which the driving oscillating arms 101a and 101b extend need only be within ±5° in terms of deviation from the Y axis. Drive electrodes 112 and 113 are respectively formed on a side surface and a top surface of the driving oscillating arm 101a, and drive electrodes 113 and 112 are respectively formed on a side surface and a top surface of the driving oscillating arm 101b. The drive electrodes 112 and 113 are respectively connected to a drive circuit 20 via an external output terminal 81 and an external input terminal 82 of the signal processing IC 2 in FIG. 1.

The driving bases 104a and 104b are coupled to a rectangular detecting base 107 via coupling arms 105a and 105b respectively extending in a −X axis direction and a +X axis direction. In this case, directions in which the coupling arms 105a and 105b extend need only be within ±5° in terms of deviation from the X axis.

A detecting oscillating arm 102 extends in the +Y axis direction and the −Y axis direction from the detecting base 107. In this case, a direction in which the detecting oscillating arm 102 extends need only be within ±5° in terms of deviation from the Y axis. Detecting electrodes 114 and 115 are respectively formed on a top surface of the detecting oscillating arm 102, and a common electrode 116 is formed on a side surface of the detecting oscillating arm 102. The detecting electrodes 114 and 115 are respectively connected to a detection circuit 30 via external input terminals 83 and 84 of the signal processing IC 2 in FIG. 1. In addition, the common electrode 116 is grounded.

Figure 3:
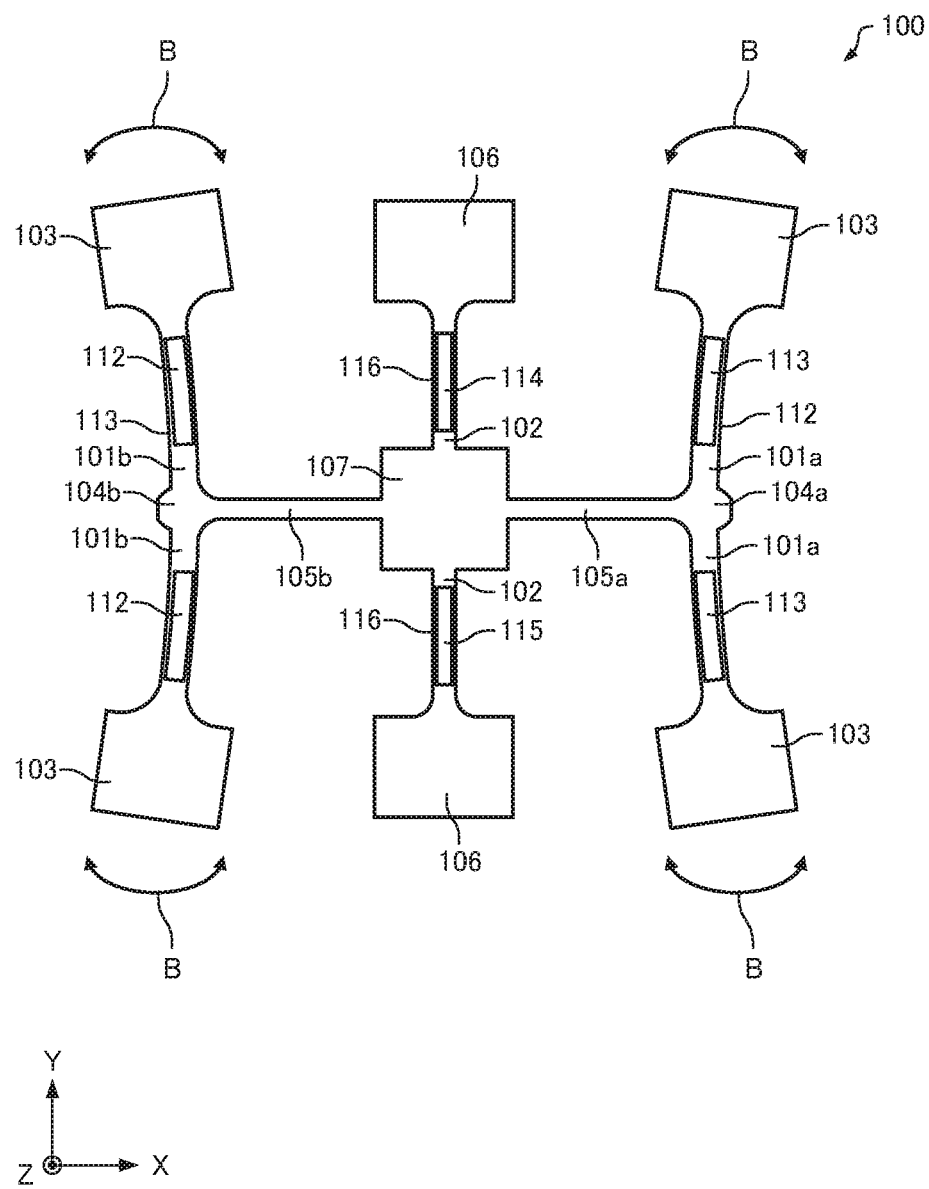
FIG. 3 is a diagram for explaining an operation of a vibrator.

When AC voltage is applied as a drive signal between the drive electrode 112 and the drive electrode 113 of the driving oscillating arms 101a and 101b, as illustrated in FIG. 3, due to an inverse piezoelectric effect, the driving oscillating arms 101a and 101b perform bending oscillation (exciting oscillation) in which tips of the two driving oscillating arms 101a and 101b repetitively approach and separate from each other as depicted by arrows B.

Figure 4:
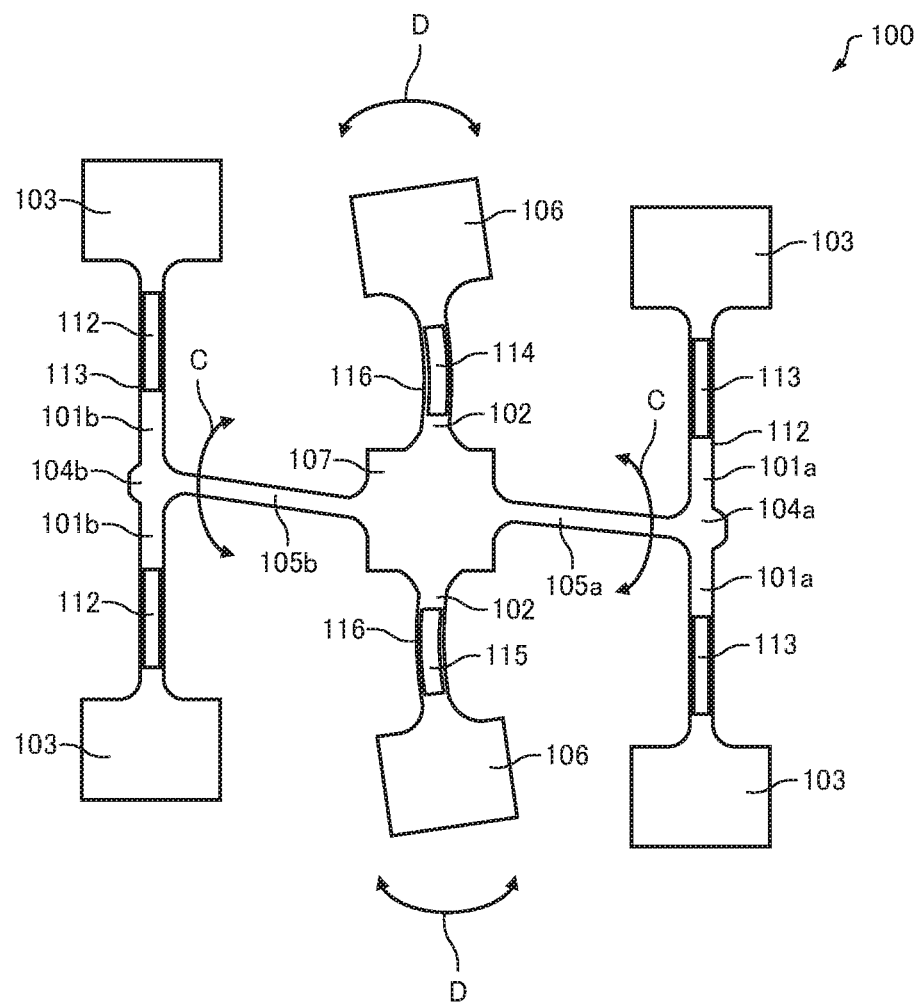
FIG. 4 is a diagram for explaining an operation of a vibrator.

In this state, when angular velocity with the Z axis as a rotational axis is applied to the oscillating piece of the vibrator 100, the driving oscillating arms 101a and 101b obtain Coriolis force in a direction perpendicular to both a direction of the bending oscillation indicated by the arrows B and the Z axis. As a result, as illustrated in FIG. 4, the coupling arms 105a and 105b oscillate as depicted by arrows C. In addition, the detecting oscillating arm 102 performs bending oscillation as depicted by arrows D in conjunction with the oscillation (the arrows C) of the coupling arms 105a and 105b. The bending oscillation of the detecting oscillating arm 102 and the bending oscillation (exciting oscillation) of the driving oscillating arms 101a and 101b which accompany Coriolis force are 90° out of phase.

When magnitudes of oscillation energy or magnitudes of amplitude of oscillation are equal between the two driving oscillating arms 101a and 101b when the driving oscillating arms 101a and 101b perform bending oscillation (exciting oscillation), oscillation energy is balanced between the driving oscillating arms 101a and 101b and the detecting oscillating arm 102 does not perform bending oscillation in a state where angular velocity is not applied to the vibrator 100. However, once the balance of oscillation energy between the two driving oscillating arms 101a and 101b is disrupted, bending oscillation occurs on the detecting oscillating arm 102 even when angular velocity is not applied to the vibrator 100. This bending oscillation is called leakage oscillation and is the bending oscillation depicted by the arrows D in a similar manner to oscillation based on Coriolis force but in a same phase as a drive signal.

In addition, due to a piezoelectric effect, an alternating charge based on these bending oscillations is generated on the detecting electrodes 114 and 115 of the detecting oscillating arm 102. In this case, an alternating charge generated based on Coriolis force varies in accordance with a magnitude of the Coriolis force (in other words, a magnitude of angular velocity applied to the vibrator 100). On the other hand, an alternating charge generated based on leakage oscillation is constant regardless of the magnitude of angular velocity applied to the vibrator 100.

Moreover, a rectangular weight section 103 with a wider width than the driving oscillating arms 101a and 101b is formed at tips of the driving oscillating arms 101a and 101b. By forming the weight section 103 at the tips of the driving oscillating arms 101a and 101b, Coriolis force can be increased and, at the same time, a desired resonance frequency can be obtained with a relatively short oscillating arm. In a similar manner, a weight section 106 with a wider width than the detecting oscillating arm 102 is formed at a tip of the detecting oscillating arm 102. By forming the weight section 106 at the tip of the detecting oscillating arm 102, the alternating charge generated at the detecting electrodes 114 and 115 can be increased.

As described above, with the Z axis as a detection axis, the vibrator 100 outputs an alternating charge (an angular velocity component) based on Coriolis force and an alternating charge (an oscillation leakage component) based on leakage oscillation of exciting oscillation via the detecting electrodes 114 and 115.

Returning to FIG. 1, the signal processing IC 2 according to the first embodiment is configured so as to include the drive circuit 20 which causes oscillation and drives the vibrator 100 and the detection circuit 30 which processes a detection signal from the vibrator 100. Moreover, the signal processing IC 2 may be configured by omitting a part of these components (elements) or by adding a new component (element) thereto.

The drive circuit 20 generates a drive signal 21 for causing exciting oscillation of the vibrator 100 and supplies the drive signal 21 to the drive electrode 112 of the vibrator 100 via the external output terminal 81. In addition, a drive signal 22 generated on the drive electrode 113 by exciting oscillation of the vibrator 100 is input to the drive circuit 20 via the external input terminal 82, in which case the drive circuit 20 performs feedback control of an amplitude level of the drive signal 21 so that an amplitude of the drive signal 22 is kept constant. Furthermore, the drive circuit 20 generates a reference signal 23 of a synchronous detection circuit included in the detection circuit 30 and a clock signal 24 of a switched-capacitor filter (SCF) circuit. In addition, the drive circuit 20 outputs an error information signal 25 (to be described later) to the outside via the external output terminal 85. Furthermore, the drive circuit 20 outputs a digital signal 297 (to be described later) to the outside via the external output terminal 87.

Alternating charges (detection currents) 31 and 32 generated on the detecting electrodes 114 and 115 of the vibrator 100 are respectively input to the detection circuit 30 via the external input terminals 83 and 84, in which case the detection circuit 30 detects only an angular velocity component included in the alternating charges (detection currents), generates a signal (an angular velocity signal) 33 of a voltage level in accordance with a magnitude of the angular velocity, and outputs the signal to the outside via the external output terminal 86. For example, the angular velocity signal 33 is subjected to A/D conversion in a microcomputer (not shown) coupled to the external output terminal 86 and used in various processes as angular velocity data. Alternatively, an A/D converter may be built into the signal processing IC 2 and digital data representing angular velocity may be output to the outside.

In this manner, the drive circuit 20 and the detection circuit 30 function as an angular velocity signal processing circuit 4 which performs signal processing with respect to the vibrator 100.

Figure 5:
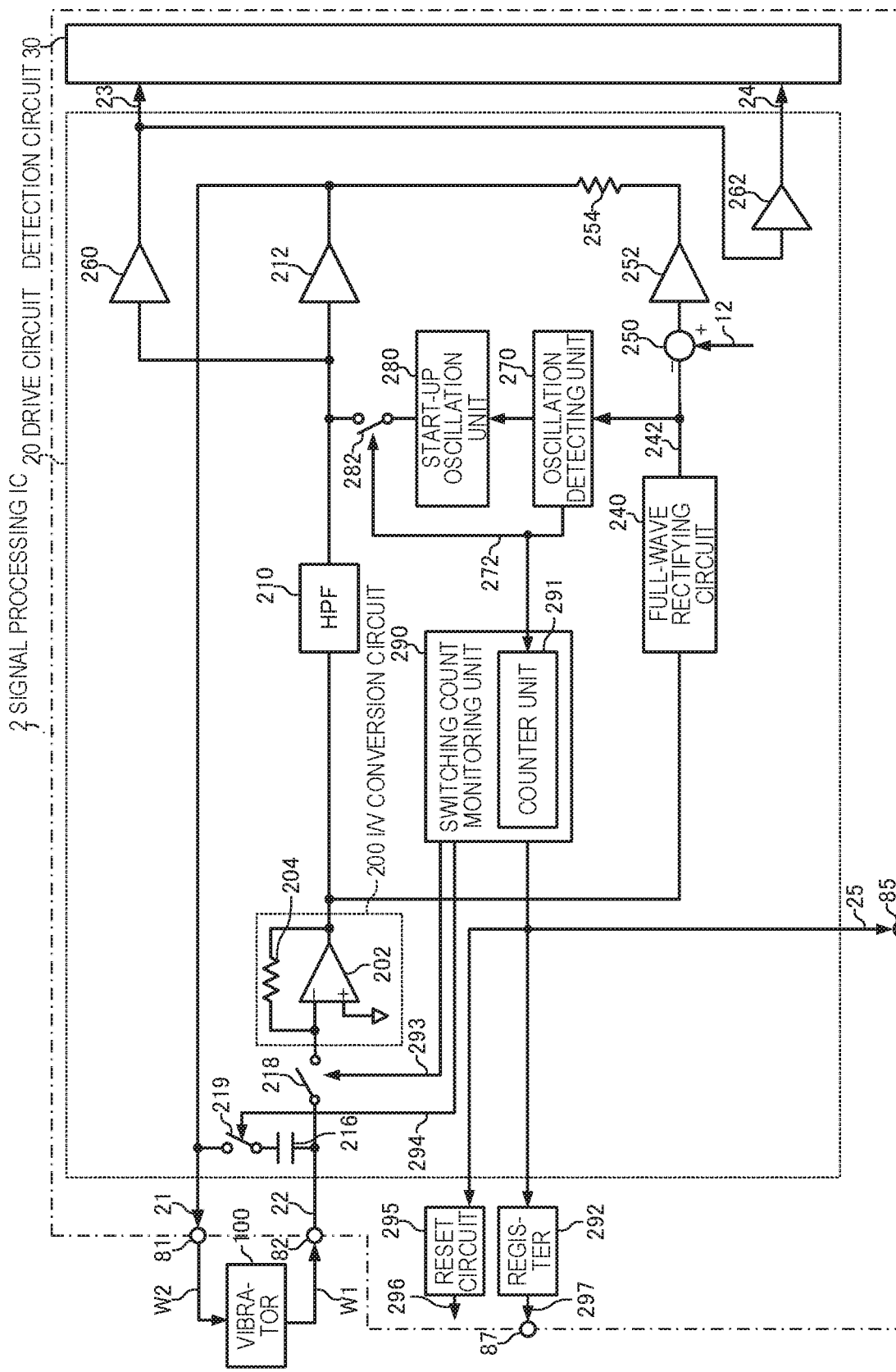
FIG. 5 is a diagram illustrating a configuration example of a drive circuit of an angular velocity detection apparatus.

Next, the drive circuit 20 will be described. FIG. 5 is a diagram illustrating a detailed configuration example of the drive circuit 20 of the angular velocity detection apparatus 1. As illustrated in FIG. 5, the signal processing IC 2 of the angular velocity detection apparatus 1 is configured so as to include a register 292 and a reset circuit 295. In addition, the drive circuit 20 is configured so as to include an I/V conversion circuit (a current/voltage conversion circuit) 200, a highpass filter (HPF) 210, a comparator 212, a capacitor 216, switches 218 and 219, a full-wave rectifying circuit 240, a subtractor 250, an integrator 252, a pull-up resistor 254, a comparator 260, a buffer circuit 262, an oscillation detecting unit 270, a start-up oscillation unit 280, a switch 282, and a switching count monitoring unit 290. Moreover, the drive circuit 20 may be configured by omitting a part of these components (elements) or by adding a new component (element) thereto.

A drive current flowing to the oscillating piece of the vibrator 100 is converted into an AC voltage signal by the I/V conversion circuit 200. The I/V conversion circuit 200 according to the first embodiment is configured such that a resistor 204 is connected between an inverting input terminal (− input terminal) and an output terminal of an operational amplifier 202 and a non-inverting input terminal (+ input terminal) of the operational amplifier 202 is connected to an analog ground.

An output signal of the I/V conversion circuit 200 is subjected to offset cancellation by the highpass filter 210 and input to the comparator 212. The comparator 212 amplifies voltage of the input signal and outputs a binarized signal (a square-wave voltage signal). However, in the first embodiment, the comparator 212 is an open drain output comparator only capable of low-level output, and high level is pulled up to output voltage of the integrator 252 via the pull-up resistor 254. In addition, the binarized signal output by the comparator 212 is supplied as the drive signal 21 to the drive electrode 112 of the oscillating piece of the vibrator 100 via the external output terminal 81. By matching a frequency (a drive frequency fd) of the drive signal 21 with the resonance frequency of the vibrator 100, the vibrator 100 can be caused to oscillate in a stable manner.

An output signal of the operational amplifier 202 is input to the full-wave rectifying circuit 240 and subjected to full-wave rectification.

An output signal (a full-wave rectifying signal 242) of the full-wave rectifying circuit 240 is input to the subtractor 250 and, after being subjected to a voltage subtracting process with reference voltage 12, the output signal is integrated by the integrator 252. Output voltage of the integrator 252 decreases as an amplitude of the output signal of the I/V conversion circuit 200 increases. In addition, high level of the drive signal 21 is pulled up to output voltage of the integrator 252 via the pull-up resistor 254. Due to such a configuration, an amplitude level of the drive signal 21 is subjected to feedback control so that an amplitude of the drive signal 22 of the vibrator 100 is kept constant.

However, if oscillation of the vibrator 100 is stopped immediately after supplying power, the oscillation of the vibrator 100 must be started and assisted until the oscillating operation stabilizes to enable such feedback control to be promptly carried out.

To this end, the first embodiment is provided with: the oscillation detecting unit 270 which detects an oscillating state or a non-oscillating state of the vibrator 100 based on a drive signal of the vibrator 100; the start-up oscillation unit 280 which assists an oscillating operation of the vibrator 100 when a detection result of the oscillation detecting unit 270 represents a non-oscillating state; and the switch 282.

The start-up oscillation unit 280 is an oscillation circuit which performs self-oscillation at a frequency near the resonance frequency of the vibrator 100 and which assists an oscillating operation of the vibrator 100. The start-up oscillation unit 280 can be realized by, for example, a CR oscillation circuit.

The oscillation detecting unit 270 detects an oscillating state or a non-oscillating state of the vibrator 100 based on the drive signal 22 of the vibrator 100. The oscillation detecting unit 270 compares a voltage level of an output signal (the full-wave rectifying signal 242) of the full-wave rectifying circuit 240 with a predetermined threshold, causes an oscillating operation of the start-up oscillation unit 280 to continue until the voltage level of the full-wave rectifying signal 242 reaches a predetermined threshold V1 (until the drive signal 22 reaches a predetermined value), and once the voltage level of the full-wave rectifying signal 242 reaches the threshold V1 (once the drive signal 22 reaches the predetermined value), causes the oscillating operation of the start-up oscillation unit 280 to stop. In addition, the oscillation detecting unit 270 generates a switch control signal 272 for turning on the switch 282 until the voltage level of the full-wave rectifying signal 242 reaches the threshold V1 (until the drive signal 22 reaches the predetermined value) and turning off the switch 282 once the voltage level of the full-wave rectifying signal 242 reaches the threshold V1 (once the drive signal 22 reaches the predetermined value).

An anomaly may occur in which are repeated a first state where an amplitude of the drive signal 22 driving the vibrator 100 increases and, after oscillation start-up of the vibrator 100, the amplitude of the drive signal 22 decreases and the vibrator 100 enters a non-oscillating state and a second state where detection of the non-oscillating state prompts oscillation start-up, the amplitude of the drive signal 22 increases, and the vibrator 100 enters an oscillating state. An occurrence of such an anomaly may affect accuracy and reliability of signals output by circuits (such as the detection circuit 30) which operate based on the vibrator 100.

In consideration thereof, in the first embodiment, the drive circuit 20 is provided with the switching count monitoring unit 290 which detects that the number of times switching is performed between the oscillating state and the non-oscillating state in the oscillation detecting unit 270 has exceeded a set upper limit number of times. The upper limit number of times can be set to, for example, around 10 times.

According to the first embodiment, whether or not an anomaly in which the oscillating state and the non-oscillating state are repeated has occurred can be detected by the switching count monitoring unit 290. A physical quantity detection apparatus (the angular velocity detection apparatus 1) capable of anomaly determination output with higher reliability can be realized.

The oscillation detecting unit 270 outputs an oscillating state signal (the switch control signal 272) which represents an oscillating state or a non-oscillating state. In addition, the switching count monitoring unit 290 includes a counter unit 291 which determines whether the oscillating state signal output by the oscillation detecting unit 270 in synchronization with a clock signal with a higher frequency than a frequency of the start-up oscillation unit 280 represents the oscillating state or the non-oscillating state, and which counts the number of times switching is performed. The switching count monitoring unit 290 is supplied a clock signal from a clock signal generation circuit (not shown). In addition, the counter unit 291 can count the number of times switching is performed by counting rising edges or falling edges of an oscillating state signal (the switch control signal 272).

According to the first embodiment, since the number of times switching is performed between the oscillating state and the non-oscillating state can be counted with a simple configuration, whether or not an anomaly in which the oscillating state and the non-oscillating state are repeated has occurred can be detected with a simple configuration.

The drive circuit 20 includes the switch 218 which connects or disconnects an oscillation loop formed between the drive circuit and the vibrator. In the example in FIG. 5, the switch 218 is provided on a signal path between the external input terminal 82 and the UV conversion circuit 200. By outputting a switch control signal 293 to the switch 218, the switching count monitoring unit 290 can either connect or disconnect the switch 218.

The switching count monitoring unit 290 may disconnect and subsequently connect the switch 218 when detecting that the number of times switching is performed has exceeded the upper limit number of times. The switching count monitoring unit 290 may connect the switch 218 once a predetermined period of time has lapsed after disconnecting the switch 218.

According to the first embodiment, by performing oscillation start-up once again when an anomaly in which the oscillating state and the non-oscillating state are repeated has occurred, an appropriate oscillating operation can be prompted.

The switching count monitoring unit 290 may change a frequency of the start-up oscillation unit 280 and disconnect and subsequently connect the switch 218 when detecting that the number of times switching is performed has exceeded the upper limit number of times. The switching count monitoring unit 290 may connect the switch 218 once a predetermined period of time has lapsed after disconnecting the switch 218. In addition, when the start-up oscillation unit 280 is configured so as to include a CR oscillation circuit, the frequency of the start-up oscillation unit 280 can be changed by changing at least one value of a resistance value of a resistor and a capacity value of a capacitor constituting the CR oscillation circuit.

According to the first embodiment, by changing the frequency of the start-up oscillation unit 280 and performing oscillation start-up once again when an anomaly in which the oscillating state and the non-oscillating state are repeated has occurred, an appropriate oscillating operation can be prompted.

The drive circuit 20 receives an input of the drive signal 22 from the vibrator 100 via first wiring W1, and the drive circuit 20 outputs the drive signal 21 to the vibrator 100 via second wiring W2. In addition, the switching count monitoring unit 290 may increase a capacity between the first wiring W1 and the second wiring W2 and disconnect and subsequently connect the switch 218 when detecting that the number of times switching is performed has exceeded the upper limit number of times. The switching count monitoring unit 290 may connect the switch 218 once a predetermined period of time has lapsed after disconnecting the switch 218.

In the example in FIG. 5, the capacitor 216 and the switch 219 are connected in series between the first wiring W1 and the second wiring W2. The switching count monitoring unit 290 can increase the capacity between the first wiring W1 and the second wiring W2 by outputting a switch control signal 294 to the switch 219 and then connecting the switch 219.

According to the first embodiment, by reducing an apparent Q factor of the vibrator 100 as viewed from the drive circuit 20 and performing oscillation start-up once again when an anomaly in which the oscillating state and the non-oscillating state are repeated has occurred, an appropriate oscillating operation can be prompted.

The signal processing IC 2 includes the register 292. The register 292 is configured so as to be capable of outputting stored information to the outside as the digital signal 297 via the external output terminal 87. In addition, the switching count monitoring unit 290 may write error information into the register 292 when detecting that the number of times switching is performed has exceeded the upper limit number of times. In the example in FIG. 5, the switching count monitoring unit 290 writes error information into the register 292 by outputting the error information signal 25 to the register 292.

According to the first embodiment, error information can be readily utilized by another circuit block or apparatus.

The signal processing IC 2 includes the reset circuit 295 which outputs a reset signal 296 for performing an initialization sequence of the signal processing IC 2. The reset circuit 295 outputs the reset signal 296 when the error information signal 25 indicating that the number of times switching is performed has exceeded the upper limit number of times is input from the switching count monitoring unit 290. Once the reset signal 296 is output, the initialization sequence of the signal processing IC 2 is started. The initialization sequence may include, for example, a step of setting an initial value read from a non-volatile memory (not shown) included in the signal processing IC 2 to the counter unit 291 included in the drive circuit 20 and a step of setting an initial value stored in a non-volatile memory (not shown) as an adjustment value for setting an amplification factor of the UV conversion circuit 200. Furthermore, the reset circuit may perform the initialization sequence of the signal processing IC once a predetermined period of time lapses after power is supplied to the signal processing IC 2.

According to the first embodiment, by initializing a physical quantity detection apparatus (the angular velocity detection apparatus 1) based on the reset signal 296 output when an anomaly in which the oscillating state and the non-oscillating state are repeated has occurred, an appropriate oscillating operation can be prompted.

The switching count monitoring unit 290 may output an error signal to the outside of a physical quantity detection apparatus (the angular velocity detection apparatus 1) when detecting that the number of times switching is performed has exceeded the upper limit number of times. In the example in FIG. 5, the switching count monitoring unit 290 outputs the error information signal 25 to the outside from the external output terminal 85.

According to the first embodiment, error information can be readily utilized by another circuit block or apparatus.

The drive circuit 20 is further provided with the comparator 260 which amplifies an output signal of the highpass filter 210 and outputs a binarized signal (a square-wave voltage signal), in which case the binarized signal is used as the reference signal 23 of the synchronous detection circuit included in the detection circuit 30. A frequency of the reference signal 23 is equal to the drive frequency fd. Moreover, since a high level of the output signal of the comparator 212 fluctuates and a failure occurs when the high level fails to exceed a logical threshold in the synchronous detection circuit, the output signal of the comparator 212 is not used as a reference signal and, instead, the comparator 260 is separately provided.

In addition, an output signal of the comparator 260 is input to the buffer circuit 262, and an output signal of the buffer circuit 262 is supplied as the clock signal 24 (frequency: fd) to the SCF circuit included in the detection circuit.

Figure 6:
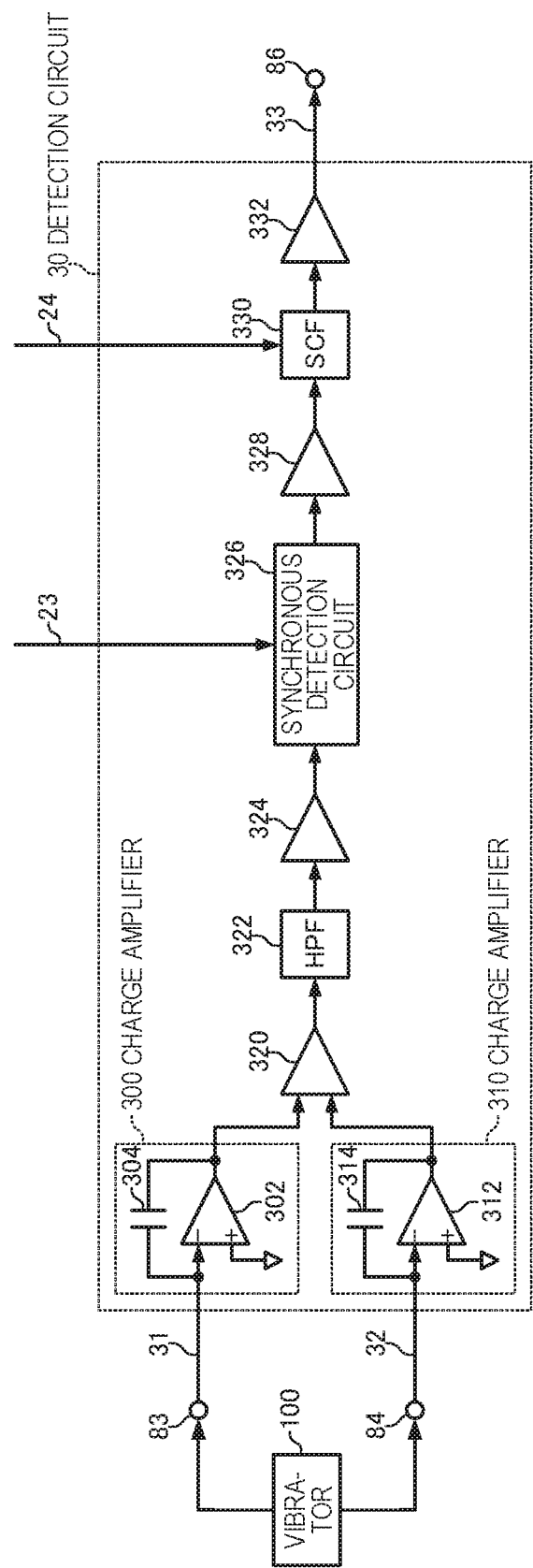
FIG. 6 is a diagram illustrating a configuration example of a detection circuit of an angular velocity detection apparatus.

Next, the detection circuit 30 will be described. FIG. 6 is a diagram illustrating a configuration example of the detection circuit 30 of the angular velocity detection apparatus 1. As illustrated in FIG. 6, the detection circuit 30 is configured so as to include charge amplifiers 300 and 310, a differential amplifier 320, a highpass filter (HPF) 322, an amplifier 324, a synchronous detection circuit 326, a variable gain amplifier 328, a switched-capacitor filter (SCF) 330, and an output buffer 332. Moreover, the detection circuit 30 may be configured by omitting a part of these components (elements) or by adding a new component (element) thereto.

An alternating charge (a detection current) 31 including an angular velocity component and an oscillation leakage component is input to the charge amplifier 300 from the detecting electrode 114 of the oscillating piece of the vibrator 100 via the external input terminal 83. In a similar manner, an alternating charge (a detection current) 32 including an angular velocity component and an oscillation leakage component is input to the charge amplifier 310 from the detecting electrode 115 of the oscillating piece of the vibrator 100 via the external input terminal 84.

The charge amplifier 300 is configured such that a capacitor 304 is connected between an inverting input terminal (−input terminal) and an output terminal of an operational amplifier 302 and a non-inverting input terminal (+ input terminal) of the operational amplifier 302 is connected to an analog ground. In a similar manner, the charge amplifier 310 is configured such that a capacitor 314 is connected between an inverting input terminal (−input terminal) and an output terminal of an operational amplifier 312 and a non-inverting input terminal (+ input terminal) of the operational amplifier 312 is connected to an analog ground. Capacity values of the capacitors 304 and 314 are set to a same value. The charge amplifiers 300 and 310 respectively convert input alternating charges (detection currents) 31 and 32 into AC voltage signals. The alternating charge (detection current) 31 input to the charge amplifier 300 and the alternating charge (detection current) 32 input to the charge amplifier 310 are 180° out of phase, and an output signal of the charge amplifier 300 and an output signal of the charge amplifier 310 have phases opposite to each other (180° out of phase).

The differential amplifier 320 differentially amplifies an output signal of the charge amplifier 300 and an output signal of the charge amplifier 310. Due to the differential amplifier 320, in-phase components are canceled while reverse phase components are added and amplified.

The highpass filter 322 cancels a direct current component included in an output signal of the differential amplifier 320.

The amplifier 324 outputs an AC voltage signal obtained by amplifying an output signal of the highpass filter 322.

The synchronous detection circuit 326 synchronously detects an angular velocity component included in an output signal of the amplifier 324 using a binarized signal output by the comparator 260 included in the drive circuit 20 as the reference signal 23. For example, the synchronous detection circuit 326 can be configured as a circuit which selects an output signal of the amplifier 324 without modification when the reference signal 23 is at a high level and selects a signal obtained by inverting the output signal of the amplifier 324 with respect to the reference voltage 12 when the reference signal 23 is at a low level.

While the output signal of the amplifier 324 includes an angular velocity component and an oscillation leakage component, the angular velocity component is in a same phase as the reference signal 23 but the oscillation leakage component is in an opposite phase to the reference signal 23. Therefore, although the angular velocity component is synchronously detected by the synchronous detection circuit 326, the oscillation leakage component is not detected.

The variable gain amplifier 328 amplifies or damps an output signal of the synchronous detection circuit 326 and outputs a signal with a desired voltage level, and an output signal of the variable gain amplifier 328 is input to the switched-capacitor filter (SCF) circuit 330.

The SCF circuit 330 functions as a lowpass filter which removes a high-frequency component included in an output signal of the variable gain amplifier 328 but allows passage of a signal in a frequency range determined according to specifications. Since frequency characteristics of the SCF circuit 330 (lowpass filter) are determined by a frequency of the clock signal 24 obtained by stable oscillation of the vibrator 100 (in the first embodiment, a frequency equal to the drive frequency fd) and a capacity ratio of a capacitor (not shown), variations in the frequency characteristics of the SCF circuit 330 are advantageously significantly smaller than in an RC lowpass filter.

An output signal of the SCF circuit 330 is buffered and amplified or damped to a signal with a desired voltage level as necessary by the output buffer 332. An output signal of the output buffer 332 is a signal with a voltage level in accordance with angular velocity and is output as an angular velocity signal 33 to the outside via the external output terminal 86 of the signal processing IC 2.

1-2. Second Embodiment

Figure 7:
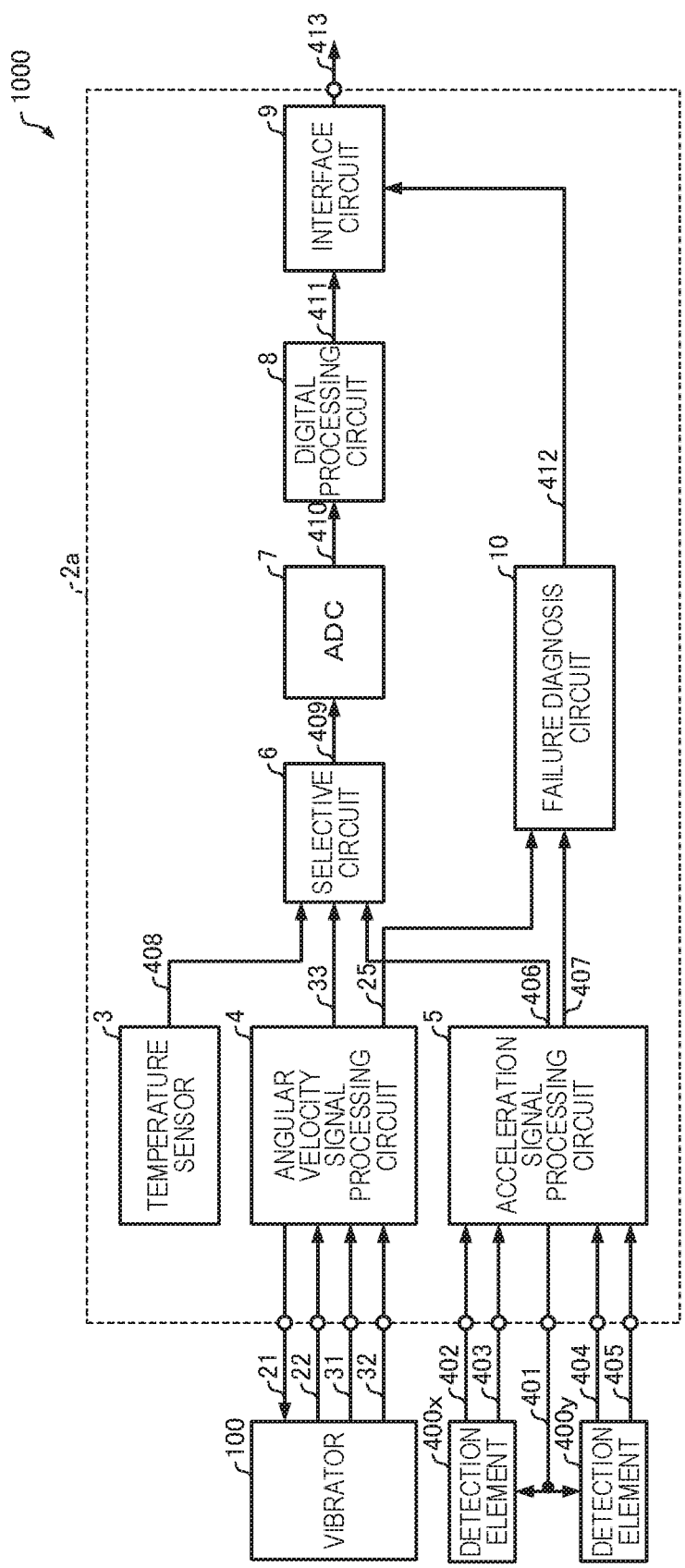
FIG. 7 is a functional block diagram of a physical quantity detection apparatus according to a second embodiment of the invention.

FIG. 7 is a functional block diagram of a physical quantity detection apparatus 1000 according to a second embodiment of the invention. Components similar to those of the first embodiment will be denoted by same reference signs and detailed descriptions thereof will be omitted.

The physical quantity detection apparatus 1000 detects angular velocity in a uniaxial direction and acceleration in a biaxial direction as physical quantities. As components for detecting angular velocity, the physical quantity detection apparatus 1000 includes the vibrator 100 and the angular velocity signal processing circuit 4. As components for detecting acceleration, the physical quantity detection apparatus 1000 includes a detection element 400x, a detection element 400y, and an acceleration signal processing circuit 5. In addition, the physical quantity detection apparatus 1000 includes a temperature sensor 3 in order to perform correction based on temperature.

The physical quantity detection apparatus 1000 according to the second embodiment further includes a selective circuit 6, an ADC (Analog-to-digital converter) 7, a digital processing circuit 8, an interface circuit 9, and a failure diagnosis circuit 10.

In the second embodiment, components other than the vibrator 100, the detection element 400x, and the detection element 400y are configured as a signal processing IC (integrated circuit apparatus) 2a. Moreover, the physical quantity detection apparatus 1000 may be configured by omitting a part of these components (elements) or by adding a new component (element) thereto.

The temperature sensor 3 outputs a temperature signal 408 in accordance with temperature to the selective circuit 6.

The angular velocity signal processing circuit 4 outputs an angular velocity signal 33 in accordance with angular velocity to the selective circuit 6. In addition, the angular velocity signal processing circuit 4 outputs the error information signal 25 to the failure diagnosis circuit 10.

The detection element 400x and the detection element 400y are constituted by capacitance type acceleration detection elements. The detection element 400x receives a carrier signal 401 from the acceleration signal processing circuit 5 and differentially outputs a detection signal 402 and a detection signal 403 in accordance with detected acceleration to the acceleration signal processing circuit 5. The detection element 400y receives a carrier signal 401 from the acceleration signal processing circuit 5 and differentially outputs a detection signal 404 and a detection signal 405 in accordance with detected acceleration to the acceleration signal processing circuit 5.

Based on the detection signals 402 to 405, the acceleration signal processing circuit 5 outputs an acceleration signal 406 in accordance with the acceleration to the selective circuit 6. In addition, the acceleration signal processing circuit 5 outputs information related to an anomaly having occurred in the acceleration signal processing circuit 5 as an error information signal 407 to the failure diagnosis circuit 10.

The selective circuit 6 sequentially selects one signal from the input signals and outputs the selected signal as a signal 409 to the ADC 7.

The ADC 7 converts an input signal into a digital signal and outputs the digital signal as a signal 410 to the digital processing circuit 8.

The digital processing circuit 8 performs a variety of digital processing on an input signal and outputs the processed signal as a signal 411 to the interface circuit 9. As the digital processing, for example, a filtering process or a process of correcting temperature characteristics may be performed.

Based on an input signal, the failure diagnosis circuit 10 determines whether or not an anomaly has occurred in at least any of the angular velocity signal processing circuit 4, the acceleration signal processing circuit 5, the vibrator 100, the detection element 400x, and the detection element 400y, and outputs a determination result as a signal 412 to the interface circuit 9.

The interface circuit 9 converts an input signal into a predetermined communication format and outputs the converted signal as a signal 413 to the outside.

Even with the physical quantity detection apparatus 1000 according to the second embodiment, similar advantageous effects to the first embodiment can be produced due to similar reasons to the first embodiment.

2. Electronic Device

Figure 8:
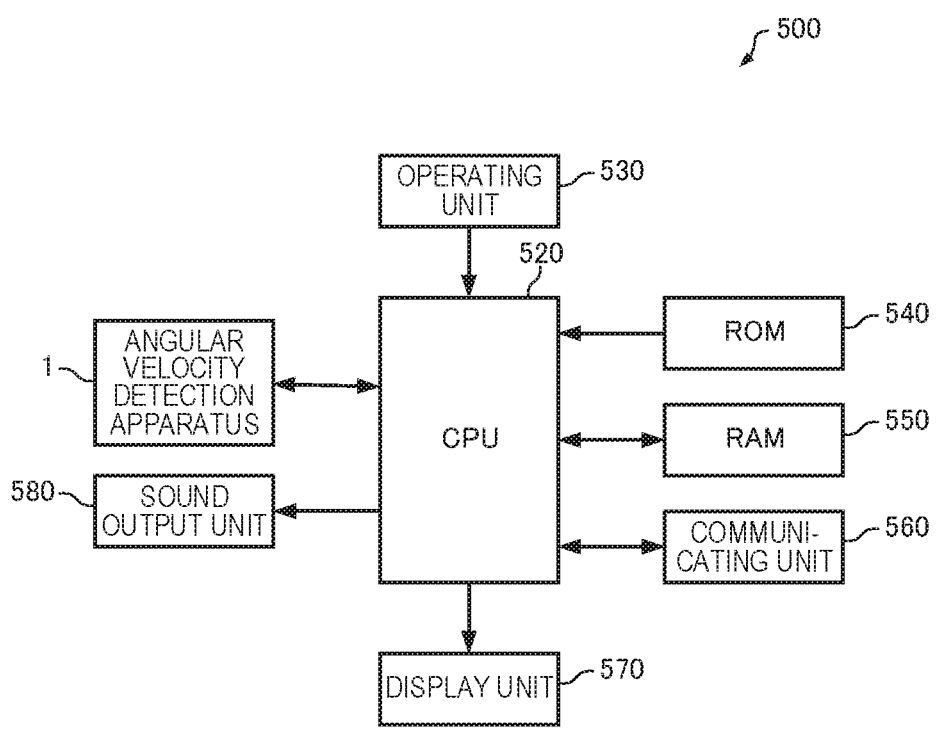
FIG. 8 is a functional block diagram of an electronic device according to one embodiment of the invention.

FIG. 8 is a functional block diagram of an electronic device 500 according to one embodiment of the invention. Moreover, components similar to those of the respective embodiments described above will be denoted by same reference signs and detailed descriptions thereof will be omitted.

The electronic device 500 includes the angular velocity detection apparatus 1 (physical quantity detection apparatus). In the example in FIG. 8, the electronic device 500 is configured so as to include the angular velocity detection apparatus 1, a CPU (Central Processing Unit) 520, an operating unit 530, a ROM (Read Only Memory) 540, a RAM (Random Access Memory) 550, a communicating unit 560, a display unit 570, and a sound output unit 580. Moreover, the electronic device 500 may be configured by omitting or changing a part of the constituent elements (respective parts) in FIG. 8 or by adding a new constituent element thereto.

In accordance with programs stored in the ROM 540 and the like, the CPU 520 performs various calculation processes and control processes using a clock pulse output by a clock signal generation circuit (not shown). Specifically, the CPU 520 performs various processes in accordance with operating signals from the operating unit 530, a process of controlling the communicating unit 560 in order to perform data communication with the outside, a process of transmitting display signals for causing the display unit 570 to display various kinds of information, a process of causing the sound output unit 580 to output various sounds, and the like.

The operating unit 530 is an input apparatus constituted by operating keys, a button switch, or the like and outputs an operating signal in accordance with an operation by a user to the CPU 520.

The ROM 540 stores programs, data, and the like which enable the CPU 520 to perform various calculation processes and control processes.

The RAM 550 is used as a working area of the CPU 520, and the RAM 550 temporarily stores programs and data read from the ROM 540, data input from the operating unit 530, results of computations executed by the CPU 520 according to the various programs, and the like.

The communicating unit 560 performs a variety of control required to establish data communication between the CPU 520 and an external apparatus.

The display unit 570 is a display apparatus constituted by an LCD (Liquid Crystal Display), an electrophoretic display, or the like, and displays various kinds of information based on display signals input from the CPU 520.

In addition, the sound output unit 580 is an apparatus which outputs sound such as a speaker.

When the CPU 520 receives the error information signal 25 from the switching count monitoring unit 290 described earlier, the CPU 520 may transmit a command instructing that an operation set in advance be performed to the angular velocity detection apparatus 1. Examples of such a command include a command instructing the reset signal 296 to be output from the reset circuit 295 of the angular velocity detection apparatus 1, a command instructing the switch 218 which connects or disconnects an oscillation loop to be disconnected and subsequently connected, and a command instructing a frequency of the start-up oscillation unit 280 to be changed and the switch 218 to be disconnected and subsequently connected.

With the electronic device 500, an electronic device with high operational reliability can be realized since the electronic device includes a physical quantity detection apparatus (the angular velocity detection apparatus 1) capable of anomaly determination output with high reliability.

Various types of electronic devices are conceivable as the electronic device 500. Examples include a personal computer (for example, a mobile personal computer, a laptop personal computer, and a tablet personal computer), a mobile terminal such as a mobile phone, a digital camera, an inkjet-type discharge apparatus (for example, an inkjet printer), a storage area network device such as a router and a switch, a local area network device, a device for a mobile terminal base station, a television set, a video camera, a video recorder, a car navigation apparatus, a pager, a personal digital assistance (including those equipped with a communication function), an electronic dictionary, a calculator, an electronic game device, a game controller, a word processor, a work station, a videophone, a security television monitor, electronic binoculars, a POS (point of sale) terminal, a medical device (for example, an electronic thermometer, a sphygmomanometer, a blood sugar meter, an electrocardiographic apparatus, an ultrasonograph, and an electronic endoscope), a fishfinder, various measurement devices, meters (for example, meters of a vehicle, an aircraft, or a vessel), a wattmeter, a flight simulator, a head-mounted display, a motion tracer, a motion tracker, a motion controller, and PDR (pedestrian dead-reckoning).

Figure 9:
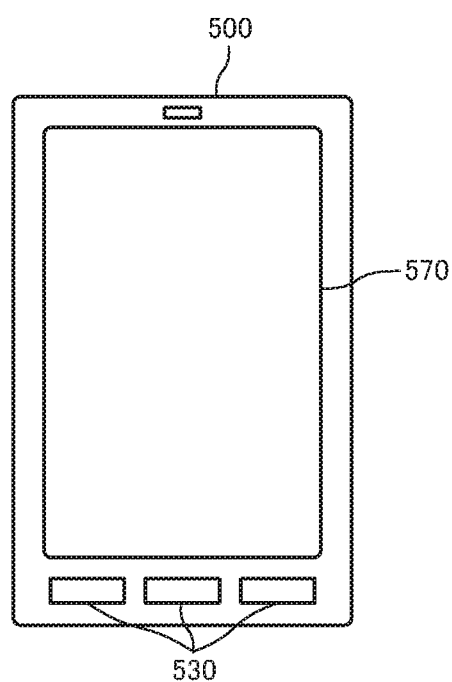
FIG. 9 is a diagram illustrating an example of an appearance of a smart phone that is an example of an electronic device.

FIG. 9 is a diagram illustrating an example of an appearance of a smart phone that is an example of the electronic device 500. The smart phone that is the electronic device 500 includes a button as the operating unit 530 and an LCD as the display unit 570. In addition, since the smart phone that is the electronic device 500 includes a physical quantity detection apparatus (the angular velocity detection apparatus 1) capable of anomaly determination output with high reliability, the electronic device 500 with high operational reliability can be realized.

3. Mobile Body

Figure 10:
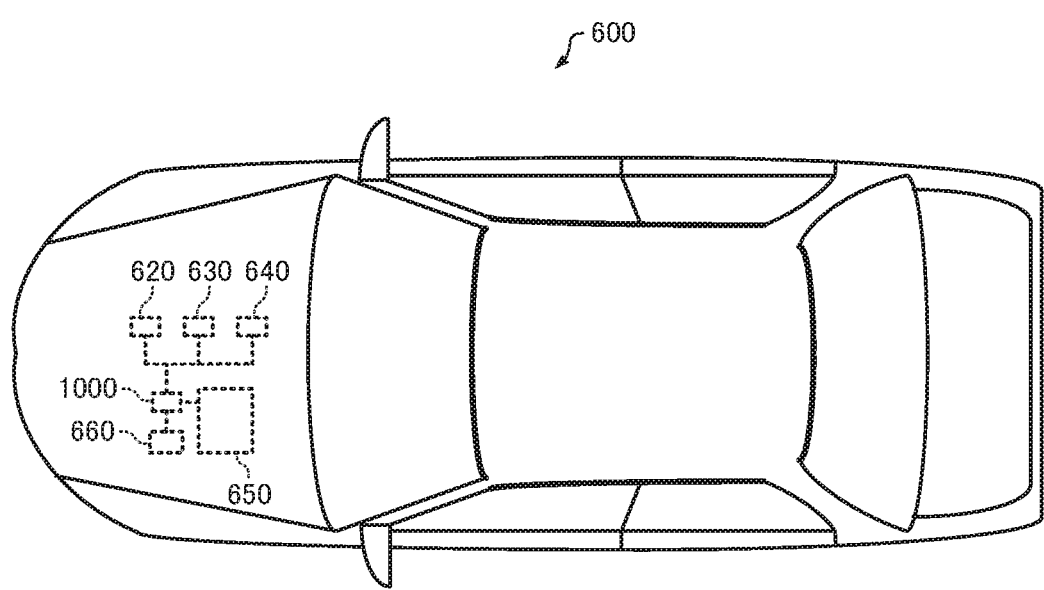
FIG. 10 is a diagram (a top view) illustrating an example of a mobile body according to one embodiment of the invention.

FIG. 10 is a diagram (a top view) illustrating an example of a mobile body 600 according to one embodiment of the invention. Moreover, components similar to those of the respective embodiments described above will be denoted by same reference signs and detailed descriptions thereof will be omitted.

The mobile body 600 includes the physical quantity detection apparatus 1000. In addition, in the example in FIG. 10, the mobile body 600 is configured so as to include a controller 620, a controller 630, and a controller 640 which perform a variety of control of an engine system, a brake system, a keyless entry system, and the like, a battery 650, and a backup battery 660. Moreover, the mobile body 600 may be configured by omitting or changing a part of the constituent elements (respective parts) in FIG. 10 or by adding a new constituent element thereto.

With the mobile body 600, since the mobile body 600 includes the physical quantity detection apparatus 1000 capable of anomaly determination output with high reliability, the mobile body 600 with high operational reliability can be realized.

Various kinds of mobile bodies are conceivable as the mobile body 600, and examples thereof include an automobile (including electric vehicles), an aircraft such as a jet plane and a helicopter, a vessel, a rocket, and an artificial satellite.

The invention is not limited to the above embodiments and various modifications can be made within the scope of the gist of the invention.

It should be noted that the embodiments and the modifications described above are merely examples and the invention is not limited thereto. For example, the respective embodiments and the respective modifications may be combined as appropriate.

The invention includes configurations which are substantially the same as the configurations described in the embodiments (for example, configurations of which a function, a method, and a result are the same or configurations of which an object and an effect are the same). In addition, the invention includes configurations in which nonessential portions of the configurations described in the embodiments have been replaced. Furthermore, the invention includes configurations which produce the same effects or configurations capable of achieving the same objectives as the configurations described in the embodiments. Moreover, the invention includes configurations in which known art is added to the configurations described in the embodiments.

The invention claimed is:

1. A physical quantity detection apparatus comprising:
a vibrator which outputs a detection signal in accordance with a physical quantity; and
a drive circuit which drives the vibrator to oscillate,
the drive circuit configured to:
detect an oscillating state or a non-oscillating state of the vibrator based on a drive signal of the vibrator;
using a start-up oscillation circuit, assist an oscillating operation of the vibrator when a detection result represents the non-oscillating state; and
detect whether a number of times switching is performed between the oscillating state and the non-oscillating state has exceeded a set upper limit number of times.

2. The physical quantity detection apparatus according to claim 1,
wherein the drive circuit is further configured to output an oscillating state signal representing the oscillating state or the non-oscillating state; and
wherein the drive circuit includes a counter configured to determine whether the oscillating state signal output by the drive circuit in synchronization with a clock signal with a higher frequency than a frequency of the start-up oscillation circuit represents the oscillating state or the non-oscillating state, and which counts the number of times switching is performed.

3. The physical quantity detection apparatus according to claim 1, further comprising a reset circuit which outputs a reset signal of the physical quantity detection apparatus when the drive circuit detects that the number of times switching is performed has exceeded the upper limit number of times.

4. The physical quantity detection apparatus according to claim 1,
wherein the drive circuit includes a switch which connects or disconnects an oscillation loop formed between the drive circuit and the vibrator; and
wherein the drive circuit disconnects and subsequently connects the switch when detecting that the number of times switching is performed has exceeded the upper limit number of times.

5. The physical quantity detection apparatus according to claim 1,
wherein the drive circuit includes a switch which connects or disconnects an oscillation loop formed between the drive circuit and the vibrator; and
wherein the drive circuit changes a frequency of the start-up oscillation circuit and disconnects and subsequently connects the switch when detecting that the number of times switching is performed has exceeded the upper limit number of times.

6. The physical quantity detection apparatus according to claim 1,
wherein the drive circuit includes a switch that connects or disconnects an oscillation loop formed between the drive circuit and the vibrator;
wherein the drive circuit receives an input of the drive signal from the vibrator via first wiring and outputs the drive signal to the vibrator via second wiring; and
wherein the drive circuit increases a capacity between the first wiring and the second wiring and disconnects and subsequently connects the switch when detecting that the number of times switching is performed has exceeded the upper limit number of times.

7. The physical quantity detection apparatus according to claim 1, further comprising a register,
wherein the drive circuit writes error information into the register when detecting that the number of times switching is performed has exceeded the upper limit number of times.

8. The physical quantity detection apparatus according to claim 1,
wherein the drive circuit outputs an error signal to the outside when detecting that the number of times switching is performed has exceeded the upper limit number of times.

9. An electronic device comprising the physical quantity detection apparatus according to claim 1.

10. A mobile body comprising the physical quantity detection apparatus according to claim 1.

* * * * *